United States Patent [19]

Nakagaki et al.

[11] Patent Number: 4,682,314
[45] Date of Patent: Jul. 21, 1987

[54] DISC PLAYBACK APPARATUS

[75] Inventors: Harushige Nakagaki; Yoshimi Iso, both of Yokohama; Shigeki Inoue, Toyokawa, all of Japan

[73] Assignee: Hitachi, Ltd., Tokyo, Japan

[21] Appl. No.: 526,782

[22] Filed: Aug. 26, 1983

[30] Foreign Application Priority Data

Aug. 30, 1982 [JP] Japan .................................. 57-149311

[51] Int. Cl.⁴ ............................................. G11B 21/10
[52] U.S. Cl. ...................................... 369/44; 369/54; 369/58
[58] Field of Search ............... 307/350, 351, 353, 358; 328/117; 369/44, 54, 58; 358/314, 336; 250/201, 202

[56] References Cited

U.S. PATENT DOCUMENTS

| | | | |
|---|---|---|---|
| 3,912,858 | 10/1975 | Kenney | 358/314 |
| 4,297,676 | 10/1981 | Moriya et al. | 307/351 X |
| 4,362,996 | 12/1982 | Priebe | 307/351 X |
| 4,520,469 | 5/1985 | Todokoro et al. | 369/44 |
| 4,525,823 | 6/1985 | Sugiyama et al. | 369/44 |

FOREIGN PATENT DOCUMENTS 58-212632 12/1983 Japan .................................. 369/44
58-212627 12/1983 Japan .................................. 369/44

Primary Examiner—Aristotelis M. Psitos
Attorney, Agent, or Firm—Antonelli, Terry & Wands

[57] ABSTRACT

In a disc playback apparatus using an optical pickup or the like, any flaws on a track of the disc are detected using: a first level detector for detecting a maximum value level of a recording information signal of an output of the pickup; a second level detector for detecting a change of the maximum value level of the recording information signal; and a comparator for comparing outputs of the above first and second level detectors. When any flaws are detected, a driving signal of a driving device for the pickup is held to a fixed reference potential.

6 Claims, 17 Drawing Figures

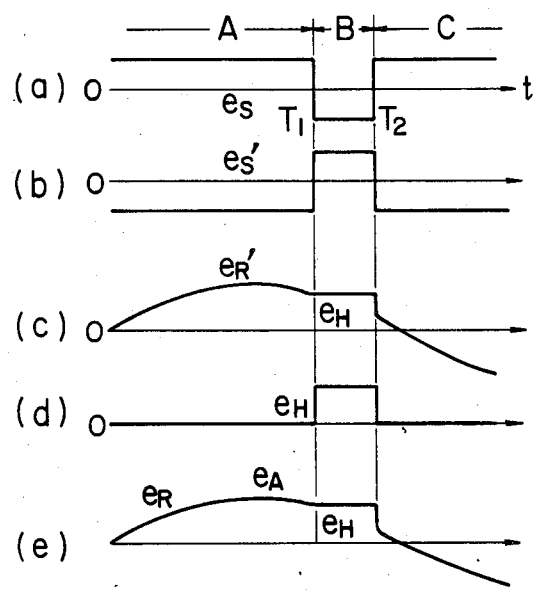

DISC PLAYBACK APPARATUS

This invention relates to a digital audio disc (DAD) player and a video disc player and, more particularly, to a disc playback apparatus which detects defects and flaws on a track of a disc and compensates tracking jumps due to the defects or the like.

A three-spot method is known as one of the tracking servo methods of a pickup in an optical DAD player.

FIG. 1 shows such a three-spot method, in which a reference numeral 1 denotes a spot for detecting a focus and a PCM signal; 2 and 3 indicate spots for tracking; and 4-1, 4-2 and 4-3 show signal pits on a track of a disc.

These spots are normally positioned such that the spot 1 is on the track and substantially half portions of each part of the spots 2 and 3 are on the track and almost half remaining portions are on the mirror surface. FIG. 2 is a diagram showing a servo loop of the track, in which reference numerals 5 and 6 denote photo-detecting devices; 7 and 8 indicate current-voltage converters; 9 represents a differential amplifier; 10 is a phase compensating circuit; and 11 is an actuator to move a pickup along the direction crossing a track.

The photo-detecting devices 5 and 6 are adapted to receive reflected light beams of the spots 2 and 3 of FIG. 1, respectively, and to output currents in accordance with the strengths of the light beams. These current outputs are respectively converted into voltage values by the current-voltage converters 7 and 8, and a difference between both values is detected by the differential amplifier 9. Since the light spots 1 to 3 are constituted to integrally move, when these spots move from the above-mentioned normal positions on the track to the right in FIG. 1, most of the spot 2 is irradiated on the mirror surface; on the contrary, most of the spot 3 is irradiated on the track surface. Thus, a current of the photo-detecting device 5 increases and a current of the photo-detecting device 6 decreases, causing a positive voltage to be produced at an output of the differential amplifier 9. Contrarily, when the spots 1 to 3 move from the normal positions on the track to the left in FIG. 1, a negative voltage is produced at the output of the differential amplifier 9 due to the opposite operation as above. Since the output of the differential amplifier 9 is added through the phase compensating circuit 10 to the actuator 11 of the pickup, if the spots 1 to 3 deviate from the normal positions on the track to the right or left, the actuator acts to operate to correct this deviation on the basis of the positive or negative output voltage from the differential amplifier 9. That is to say, the servo-operation is always applied so that the spots 2 and 3 are preferably balanced and trace on the track and that the output of the differential amplifier 9 becomes zero.

On the other hand, in such an optical servo circuit as described above, if a disc is defective or any flaws or the like exist on the surface of the disc, there will be no reflected light beams from the spots. Thus, no tracking error signal can be detected and the servo-operation is disabled and a problem of occurrence of tracking jump is caused; therefore, the compensation thereof is inevitable.

It is an object of the present invention to provide a disc playback apparatus which detects the above-mentioned flaws or the like of the disc and compensates tracking jumps.

To accomplish the above object, the present invention paid attention to the phenomenon that when flaws or the like exist on the track of the disc, the reflected light beams from the spots for detecting PCM signals are reduced and a maximum value level of the PCM signal is reduced. The present invention includes a detector for detecting a maximum value of a PCM readout signal and a detector for detecting a change of the maximum value; a relation in magnitude of both levels is discriminated by a comparator, thereby detecting the presence of flaws.

In the present invention there are provided a switching device to control driving signals of the pickup actuator, a generator for generating a predetermined potential and the above-mentioned flaw detector. When any flaws are present on the track of the disc, the predetermined potential generator is made operative by an output of the flaw detector and at the same time the switching devices are controlled, and the pickup actuator is removed from the track loop and connected to the predetermined potential generator, thereby holding the voltage to be applied to the actuator to a constant or reference potential.

The present invention will be apparent from the following detailed description taken in conjunction with the accompanying drawings, in which.

Figure 3:
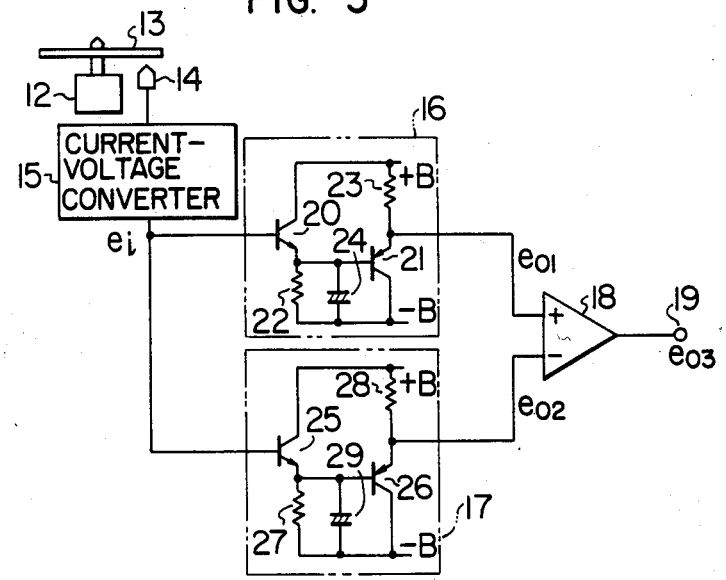
FIG. 3 is a diagram showing an embodiment of the present invention.
Figure 4:
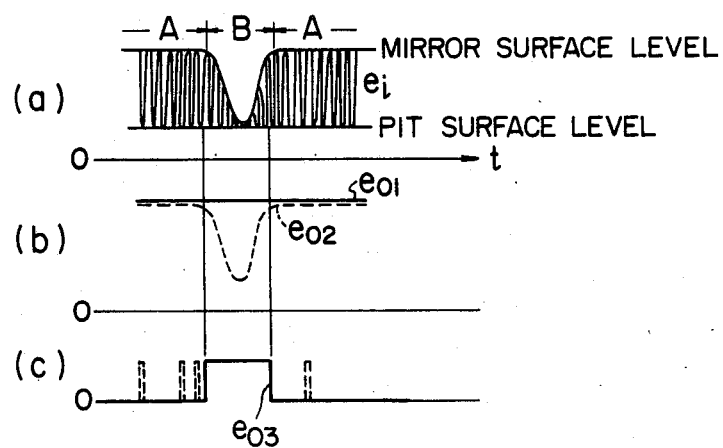
Figure 5:
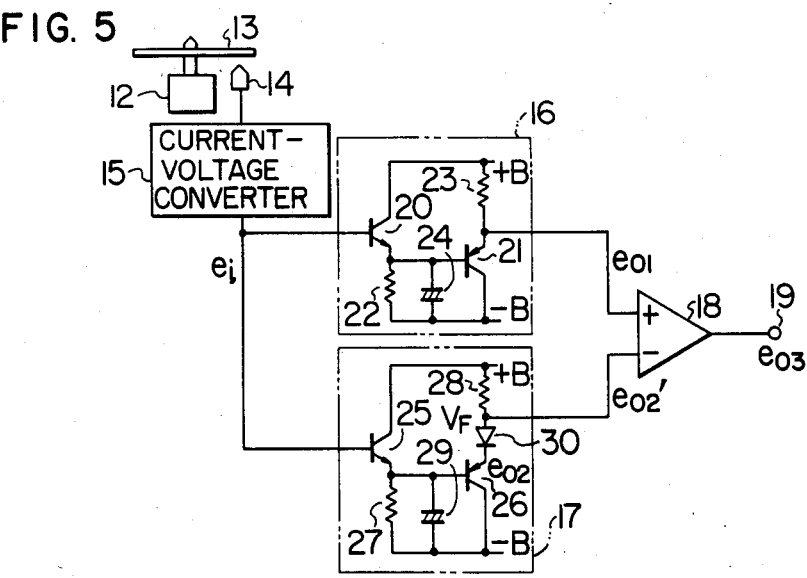
Figure 6:
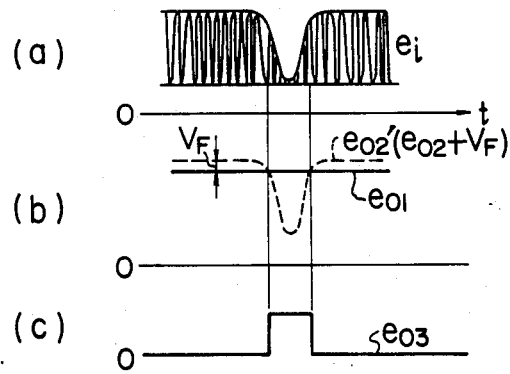
Figure 7:
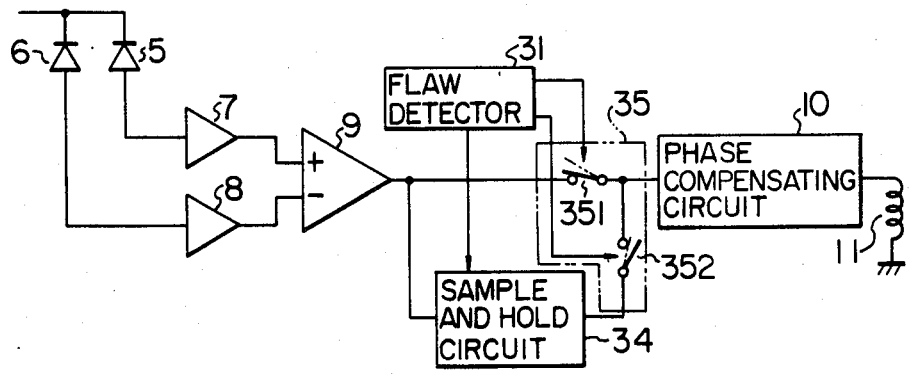
Figure 8:
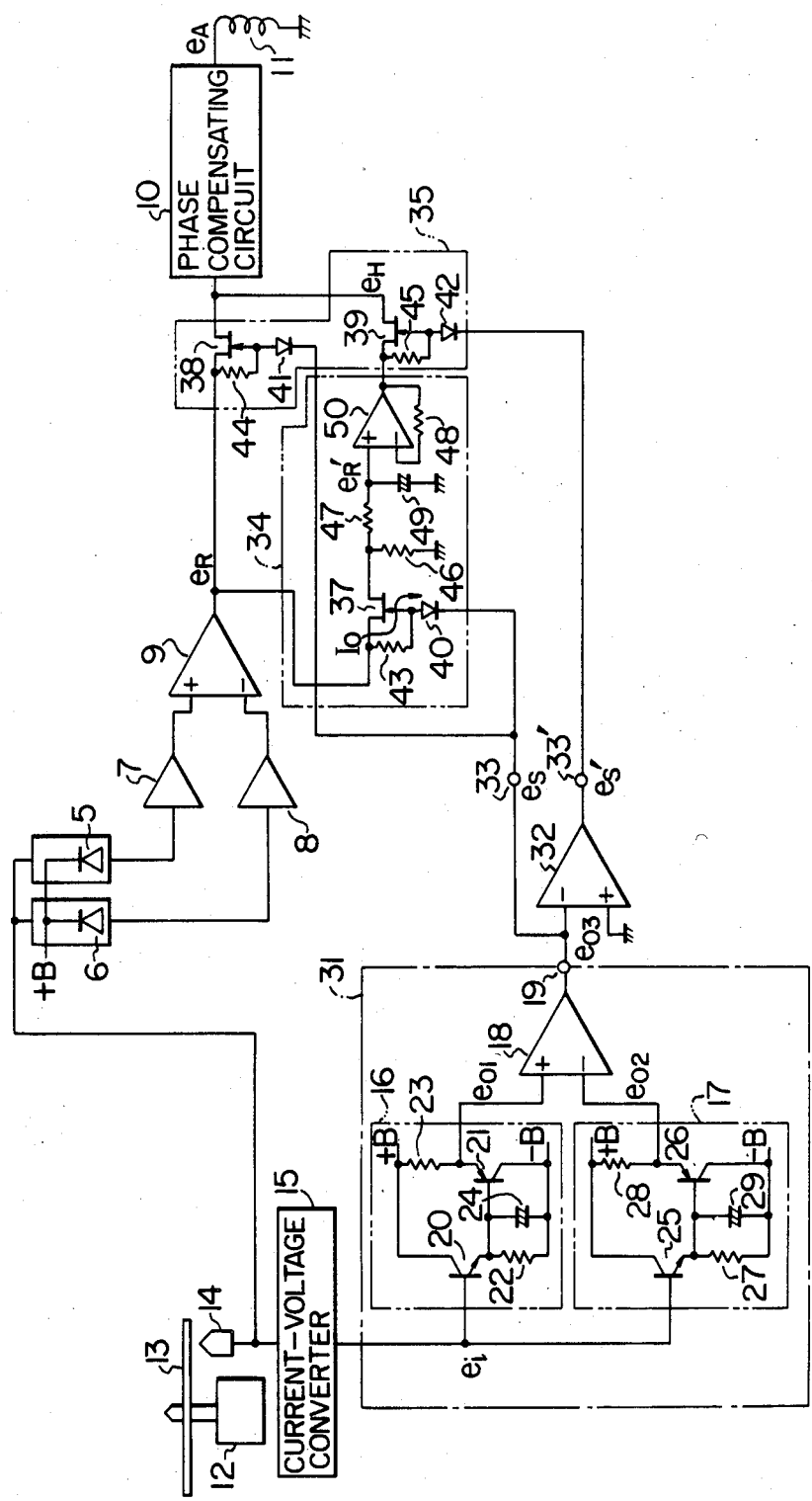

FIG. 4, consisting of (a)-(c), is a waveform diagram to describe the operation of FIG. 3;

FIG. 5 is a diagram showing another embodiment of the present invention;

FIG. 6, consisting of (a)-(c), is a waveform diagram to describe the operation of FIG. 5;

FIG. 7 is a diagram showing further another embodiment of the present invention;

FIG. 8 is a concrete circuit diagram of FIG. 7; and

FIG. 9, consisting of (a)-(e) is a waveform diagram to describe the operation of FIG. 4.

An embodiment of the present invention will be described hereinbelow with reference to the drawings.

FIG. 3 is a diagram showing an embodiment according to the present invention. In the drawing, a reference numeral 12 indicates a motor for driving a disc; 13 denotes an information recording disc; 14 is an optical pickup which is a signal readout device; 15 a current-voltage converter; 16 a detector for detecting a maximum value level of a pickup detection signal, i.e. the PCM signal of which the reflected light beam of the spot 1 shown in FIG. 1 was converted from current into voltage; 17 a detector for detecting a change of the maximum value level of the PCM signal; 18 a voltage comparator; and 19 an output terminal of the voltage comparator 18.

The operation of the circuit of FIG. 3 will be described hereinafter with reference to each waveform diagram shown in FIG. 4.

Figure 1:
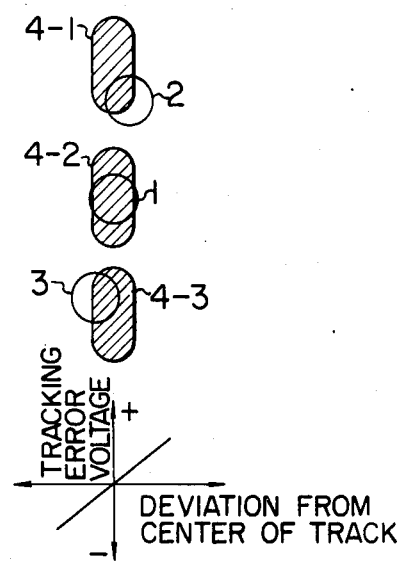
FIG. 1 is a diagram showing the positional relation of the signal pits and three spots on the track of a disc.
Figure 2:
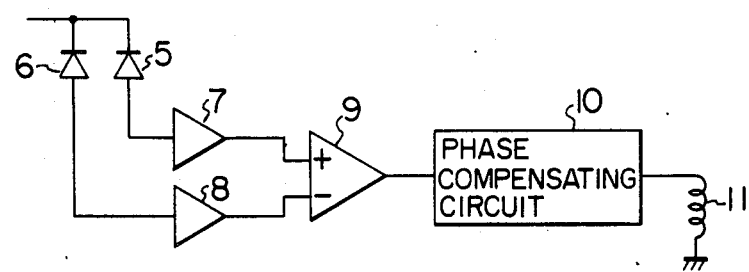
FIG. 2 is a diagram showing a conventional tracking servo circuit.

In the state such that the disc driving motor rotates and the tracking servo is applied, the reflected light beam of the spot 1 shown in FIG. 1 is received by the pickup 14 and is detected as a signal $e_i$ as shown in FIG. 4(a) through the current-voltage converter 15, and is input to the level detectors 16 and 17. The amplitude of the level of the signal $e_i$ is constant as shown in a region A of FIG. 4(a) when no flaw is present on the track of the disc since the spot 1 is on the track of the disc and traces the signal pit. In other words, when a spot is irradiated on a signal pit, a signal at the lowest level is output, and when the spot has passed out of the signal pit and is irradiated on the mirror surface, a signal at a highest level is output.

However, if any flaws or the like exist on the track of the disc, the reflected light beams from the spots are remarkably reduced, so that at this time a large dent is caused in the signal level as shown in a region B.

The level detector 16 comprises: a well-known emitter follower detector consisting of a transistor 20, a resistor 22 and a capacitor 24; and a resistor 23 and a level shifting transistor 21 for compensating a voltage drop between the base and emitter of the transistor 20, and the detector 16 serves to detect and hold the maximum value of the input signal $e_i$. That is to say, by setting a discharge time constant of the resistor 22 and capacitor 24 to be large enough for the time interval in response to the width B of the flaw on the track of the disc of FIG. 4, its detection output $e_{01}$ equal the peak value of the signal $e_i$ as shown in FIG. 4(b).

Although the level detector 17 is a circuit to detect the maximum value of an input signal similarly to the level detector 16, a discharge time constant of a resistor 27 and capacitor 29 has been set to be small so as to follow the change of the dent of the signal $e_i$ due to the flaw of FIG. 4(a); therefore, an envelope of the maximum value of the signal $e_i$ is obtained at its output $e_{02}$ as shown in FIG. 4(b).

With such a construction, when the levels of the outputs $e_{01}$ and $e_{02}$ of the level detectors 16 and 17 are compared by the voltage comparator 18, a pulse wave of $e_{03}$ as shown in FIG. 4(c) is obtained at the output terminal 19 of the voltage comparator 18 when $e_{01} > e_{02}$, so that the presence of the flaw on the track of the disc can be detected.

On the contrary, in the circuit of FIG. 3, in the case where the detection of the envelope is too sensitive by setting the time constant of the resistor 27 and capacitor 29 of the level detector 17 to be small, or when there is a fluctuation in the maximum value of the signal $e_i$, the relation of magnitudes between the outputs $e_{02}$ and $e_{01}$ is reversed due to a ripple voltage in the output $e_{02}$, so that pulses may be generated in the region other than the flaw on the track of the disc as shown by the broken lines of FIG. 4(c).

FIG. 5 shows another embodiment according to the present invention in which the above-mentioned drawback was solved. In the drawing, a reference numeral 30 represents a diode connected between the emitter of a level shifting transistor 26 and an output resistor 28 of the level detector 17, and the other same or similar elements and components as those shown in FIG. 3 are designated by the same reference numerals.

This embodiment intends to shift the envelope detection output $e_{02}$ of the signal $e_i$ by only the level corresponding to the threshold voltage $V_F$ by the diode 30 and thereby to compare the levels of an output $e_{02'}$, after the level shifting with the peak value output $e_{01}$ of the level detector 16 by the comparator 18. As shown in FIG. 6(b), it is possible to correctly detect the presence of flaw without generating unnecessary pulses due to the ripple voltage included in the output $e_{02}$, since the offset of $V_F$ is included in the comparison levels of $e_{01}$ and $e_{02'}$.

In the embodiment of FIG. 5, the case has been shown where the output $e_{02}$ of the level detector 17 is leveled up due to insertion of the diode 30; however, it is a matter of course that other arrangements are also possible. For example, $e_{01}$ may be leveled down by inputting the output of the level detector 16 to the comparator through a diode or directly from the capacitor 24 by removing the transistor 21, or the like. Or the similar effect can be obtained by directly setting an offset between the positive and negative input terminals of the voltage comparator 18.

FIG. 7 is a block diagram showing still another embodiment according to the present invention. In the drawing, a reference numeral 34 indicates a sample and hold circuit; 31 denotes a detector for detecting flaws on the track of the disc; and 35 represents a switching device consisting of switches 351 and 352.

According to this embodiment, presence and absence of flaws on the track of the disc are discriminated by the flaw detector 31. When no flaw is detected, the switch 352 is opened by a control signal of the flaw detector 31 and the switch 351 is short-circuited, thereby supplying a driving voltage of the actuator 11 from the differential amplifier 9 for allowing the ordinary servo-operation to be performed. When any flaws have been detected, the sample and hold circuit 34 is made operative by a control signal of the flaw detector 31 and at the same time the switch 352 is short-circuited and the switch 351 is opened, thereby holding a driving voltage of the actuator 11 into a tracking error voltage, which is an output of the sample and hold circuit, at the time of tracing the flaw.

FIG. 8 shows the concrete embodiment of FIG. 7. In the drawing, a reference numeral 32 denotes an inverter; 33 and 33' show terminals; 37 to 39 represent junction-type field effect transistors (hereinafter, referred to as FETs) as electronic switches; 40 to 42 are diodes; 43 to 48 are resistors; 49 is a smoothing capacitor; and 50 is a buffer amplifier. The other same and similar parts and components as those shown in FIGS. 3 and 7 are designated by the same reference numerals.

The FETs 37 to 39 are turned off when negative bias voltages are applied between each of the input electrodes and the gate electrodes and are turned on when bias voltages are zero. In other words, when the control signal of the flaw detector 31 becomes negative, the FET 37, for example, is turned off since a direct current $I_0$ flows from the input electrode through the resistor 43 and diode 40 and the gate electrode is DC-biased to the negative by only the voltage drop due to the resistor 43 against the input electrode. When the control signal of the flaw detector 31 becomes positive, the FET 37 is turned on since $I_0$ is cut off due to the rectifying action of the diode 40 and the bias voltage between the input electrode and the gate electrode becomes zero.

The resistor 47 and capacitor 49 constitute a low-pass filter and its time constant has been set to a value to follow an output $e_R$ of the differential amplifier 9.

The resistor 46 serves to discharge the charges accumulated in the capacitor 49 when the FET 37 was turned off; however, this value has been set to be higher enough against the resistor 47, namely, so that the discharge time constant is larger than the charge time constant of the capacitor 49.

As shown in FIG. 9(a), the flaw detector 31 is constituted in such a manner that it outputs a positive control voltage $e_s$ in the regions A and C where no flaw is present on the track of the disc and a negative control voltage $e_s$ in the region B where flaws are present, and that it outputs a control voltage $e_{s'}$ shown in FIG. 9(b)

which is made complementary with $e_s$ by passing through the inverter 32.

With such a construction as described above, the FET 38 is turned on and the FET 39 is turned off in the region A of FIG. 9(a) where no flaw is present on the track of the disc; thus, the output of the differential amplifier 9 is connected to the pickup actuator 11 for allowing the ordinary servo-operation to be performed.

At this time, since the FET 37 is also on, a tracking error differential voltage $e_{R'}$ as shown in FIG. 9(c) which is equal to the output $e_R$ of the differential amplifier 9 is obtained at the output of the low-pass filter.

Then, when the flaw on the track of the disc is detected at time $T_1$ by the flaw detector 31, the control signal $e_s$ is inverted from positive to negative and $e_{s'}$ is inverted from negative to positive. Due to this, since the FETs 37 and 38 are turned over from on to off and the FET 39 is turned over from off to on, the output $e_{R'}$ of the low-pass filter is held into a reference value $e_H$ at the moment $T_1$ when the pickup starts tracing the flaw on the track of the disc as shown in FIG. 9(c), and at the same time, this reference voltage $e_H$ is output through the buffer amplifier 50 and FET 39 as shown in FIG. 9(d). That is, as shown in FIG. 9(e), a voltage $e_A$ to be applied to the actuator 11 is held from the tracking error voltage $e_R$ into a constant or reference value $e_H$ through the path of the FET 39.

At time $T_2$ when the pickup has passed through the flaw on the track of the disc, the FETs 37 and 38 are turned over again from off to on and the FET 39 is turned over again from on to off by the control signals of the flaw detector 31. Thus, the driving signal $e_A$ of the actuator 11 is switched from the reference holding voltage $e_H$ to the tracking error voltage $e_R$ to return to the ordinary servo-operation.

As described above, according to the present invention, it is possible to realize a detector for correctly detecting flaws on the track of the disc by an extremely simple circuit construction.

Moreover, according to the present invention, if a tracking servo error signal cannot be detected due to the presence of the flaws or the like on the track of the disc, the driving signal of the pickup actuator is held into a constant or reference potential; therefore, an imitation servo loop can be constructed even in the time interval when any flaws are detected and it is possible to realize a servo circuit with less tracking jump.

We claim:

1. An apparatus for use in an optical disc player, for detecting flaws on a disc, said disc player including an optical pickup for receiving a reflected light from a light spot on the disc and for deriving a recording information signal, comprising:

parallel connected first and second electric circuits for receiving said recording information signal and for producing respective outputs; and a comparator for receiving said respective outputs and for detecting a dent in said recording information signal to thereby detect a flaw on said disc, said dent being caused by said flaw;

said first electric circuit including first level detecting means for detecting a maximum value level of said recording information signal, said first level detecting means including a first resistor and a first capacitor having values set so that a discharge time constant of said first resistor and first capacitor is large as compared with a time interval corresponding to a width of the flaw, to enable the detection of said maximum value level without disturbance from said flaw;

said second electric circuit including second level detecting means for detecting a change of the maximum value level of said recording information signal, said second level detecting means including a second resistor and a second capacitor having values set so that a discharge time constant of said second resistor and second capacitor is small enough to follow the change of the dent in the level of said recording information signal;

said comparator comparing the output of said first level detecting means with the output of said second level detecting means to detect the flaw and for providing an output indicative thereof.

2. An apparatus according to claim 1, further comprising level shifting means coupled to one of said first and second level detecting means, for shifting one of the outputs of said first and second level detecting means so that the level-shifted and non-level shifted outputs of said first and second level detecting means are compared with one another by said comparator.

3. A servo apparatus for use in an optical disc player including an optical pickup for receiving a reflected light from a light spot on a disc and for deriving a recording information signal, comprising:

means for detecting flaws on a disc, including parallel connected first and second electric circuits for receiving said recording information signal and for producing respective outputs, and a comparator for receiving said respective outputs and for detecting a dent in said recording information signal to thereby detect a flaw on said disc and for providing an output indicative thereof, said dent in said recording information signal being caused by said flaw, wherein said first electric circuit includes first level detecting means for detecting a maximum value level of said recording information signal, said first level detecting means including a first resistor and a first capacitor having values set so that a discharge time constant of said first resistor and first capacitor is large as compared with a time interval corresponding to a width of the flaw, to enable the detection of said maximum value level without disturbance from said flaw, said second electric circuit includes second level detecting means for detecting a change of the maximum value level of said recording information signal, said second level detecting means including a second resistor and a second capacitor having values set so that a discharge time constant of said second resistor and second capacitor is small enough to follow the change of the dent in the level of said recording information signal, and said comparator comparing the output of said first level detecting means with the output of said second level detecting means to detect the flaw and provide the output indicative thereof;

a driving device for driving said optical pickup;

means for generating a reference potential; and switching means for switching input signals of said driving device, whereby when said flaw detecting means detects any flaws present on a track of said disc, said reference potential generating means is made operative by an output of said comparator and said switching means is controlled to switch over a driving signal of said optical pickup driving device to an output of said reference potential generating means.

4. A servo apparatus according to claim 3, wherein said reference potential generating means comprises a sample and hold circuit for sampling and holding tracking error signals detected by said optical pickup.

5. A servo apparatus according to claim 3, wherein said flaw detecting means further comprises:
shifting circuit means for shifting the level of one of the outputs of said first and second level detecting means;
said comparator comparing an output of said shifting circuit means with the other output of said first and second level detecting means which is not shifted by said shifting circuit means.

6. A servo apparatus according to claim 5, wherein said reference potential generating means comprises a sample and hold circuit for sampling and holding the tracking error signals detected by said optical pickup.

* * * * *